(12) United States Patent
Chishti

(10) Patent No.: US 10,623,565 B2
(45) Date of Patent: Apr. 14, 2020

(54) TECHNIQUES FOR BEHAVIORAL PAIRING IN A CONTACT CENTER SYSTEM

(71) Applicant: Afiniti, Ltd., Hamilton (BM)

(72) Inventor: Zia Chishti, Washington, DC (US)

(73) Assignee: Afiniti Europe Technologies Limited, Chesire (GB)

( * ) Notice: Subject to any disclaimer, the term of this patent is extended or adjusted under 35 U.S.C. 154(b) by 80 days.

(21) Appl. No.: 15/892,886

(22) Filed: Feb. 9, 2018

(65) Prior Publication Data

US 2019/0253553 A1 Aug. 15, 2019

(51) Int. Cl.
*H04M 3/428* (2006.01)
*H04M 3/523* (2006.01)
*H04M 3/51* (2006.01)

(52) U.S. Cl.
CPC ....... *H04M 3/4285* (2013.01); *H04M 3/5191* (2013.01); *H04M 3/5232* (2013.01); *H04M 3/5235* (2013.01); *H04M 3/5238* (2013.01); *H04M 2203/2011* (2013.01); *H04M 2203/402* (2013.01); *H04M 2203/408* (2013.01)

(58) Field of Classification Search
CPC ............. H04M 3/5232; H04M 3/5238; H04M 2203/402; H04M 2203/408; H04M 2203/2011
See application file for complete search history.

(56) References Cited

U.S. PATENT DOCUMENTS

| | | |
|---|---|---|
| 5,155,763 A | 10/1992 | Bigus et al. |
| 5,206,903 A | 4/1993 | Kohler et al. |
| 5,327,490 A | 7/1994 | Cave |
| 5,537,470 A | 7/1996 | Lee |
| 5,702,253 A | 12/1997 | Bryce et al. |
| 5,825,869 A | 10/1998 | Brooks et al. |
| 5,903,641 A | 5/1999 | Tonisson |

(Continued)

FOREIGN PATENT DOCUMENTS

| | | |
|---|---|---|
| AU | 2008349500 C1 | 5/2014 |
| AU | 2009209317 B2 | 5/2014 |

(Continued)

OTHER PUBLICATIONS

Afiniti, "Afiniti® Enterprise Behavioral Pairing™ Improves Contact Center Performance," White Paper, retreived online from URL: <http://www.afinitit.com/wp-content/uploads/2016/04/Afiniti_White-Paper_Web-Email.pdf> 11 pages (2016).

(Continued)

*Primary Examiner* — Harry S Hong
(74) *Attorney, Agent, or Firm* — Wilmer Cutler Pickering Hale and Dorr LLP

(57) ABSTRACT

Techniques for behavioral pairing in a contact center system are disclosed. In one particular embodiment, the techniques may be realized as a method for behavioral pairing in a contact center system comprising determining, by at least one computer processor communicatively coupled to and configured to operate in the contact center system, a preferred hold activity for a contact; presenting, by the at least one computer processor, the preferred hold activity to the contact; and assigning, by the at least one computer processor, the contact to an available agent based on the preferred hold activity.

30 Claims, 3 Drawing Sheets

(56) References Cited

U.S. PATENT DOCUMENTS

| | | |
|---|---|---|
| 5,907,601 A | 5/1999 | David et al. |
| 5,926,538 A | 7/1999 | Deryugin et al. |
| 6,021,428 A | 2/2000 | Miloslaysky |
| 6,044,468 A | 3/2000 | Osmond |
| 6,049,603 A | 4/2000 | Schwartz et al. |
| 6,052,460 A | 4/2000 | Fisher et al. |
| 6,064,731 A | 5/2000 | Flockhart et al. |
| 6,088,444 A | 7/2000 | Walker et al. |
| 6,163,607 A | 12/2000 | Bogart et al. |
| 6,222,919 B1 | 4/2001 | Hollatz et al. |
| 6,292,555 B1 | 9/2001 | Okamoto |
| 6,324,282 B1 | 11/2001 | McIllwaine et al. |
| 6,333,979 B1 | 12/2001 | Bondi et al. |
| 6,389,132 B1 | 5/2002 | Price |
| 6,389,400 B1 | 5/2002 | Bushey et al. |
| 6,408,066 B1 | 6/2002 | Andruska et al. |
| 6,411,687 B1 | 6/2002 | Bohacek et al. |
| 6,424,709 B1 | 7/2002 | Doyle et al. |
| 6,434,230 B1 | 8/2002 | Gabriel |
| 6,496,580 B1 | 12/2002 | Chack |
| 6,504,920 B1 | 1/2003 | Okon et al. |
| 6,519,335 B1 | 2/2003 | Bushnell |
| 6,519,568 B1 | 2/2003 | Harvey et al. |
| 6,535,600 B1 | 3/2003 | Fisher et al. |
| 6,535,601 B1 | 3/2003 | Flockhart et al. |
| 6,570,980 B1 | 5/2003 | Baruch |
| 6,587,556 B1 | 7/2003 | Judkins et al. |
| 6,603,854 B1 | 8/2003 | Judkins et al. |
| 6,639,976 B1 | 10/2003 | Shellum et al. |
| 6,661,889 B1 | 12/2003 | Flockhart et al. |
| 6,704,410 B1 | 3/2004 | McFarlane et al. |
| 6,707,904 B1 | 3/2004 | Judkins et al. |
| 6,714,643 B1 | 3/2004 | Gargeya et al. |
| 6,744,878 B1 | 6/2004 | Komissarchik et al. |
| 6,763,104 B1 | 7/2004 | Judkins et al. |
| 6,774,932 B1 | 8/2004 | Ewing et al. |
| 6,775,378 B1 | 8/2004 | Villena et al. |
| 6,798,876 B1 | 9/2004 | Bala |
| 6,829,348 B1 | 12/2004 | Schroeder et al. |
| 6,832,203 B1 | 12/2004 | Villena et al. |
| 6,859,529 B2 | 2/2005 | Duncan et al. |
| 6,922,466 B1 | 7/2005 | Peterson et al. |
| 6,937,715 B2 | 8/2005 | Delaney |
| 6,956,941 B1 | 10/2005 | Duncan et al. |
| 6,970,821 B1 | 11/2005 | Shambaugh et al. |
| 6,978,006 B1 | 12/2005 | Polcyn |
| 7,023,979 B1 | 4/2006 | Wu et al. |
| 7,039,166 B1 | 5/2006 | Peterson et al. |
| 7,050,566 B2 | 5/2006 | Becerra et al. |
| 7,050,567 B1 | 5/2006 | Jensen |
| 7,062,031 B2 | 6/2006 | Becerra et al. |
| 7,068,775 B1 | 6/2006 | Lee |
| 7,092,509 B1 | 8/2006 | Mears et al. |
| 7,103,172 B2 | 9/2006 | Brown et al. |
| 7,158,628 B2 | 1/2007 | McConnell et al. |
| 7,184,540 B2 | 2/2007 | Dezonno et al. |
| 7,209,549 B2 | 4/2007 | Reynolds et al. |
| 7,231,032 B2 | 6/2007 | Nevman et al. |
| 7,231,034 B1 | 6/2007 | Rikhy et al. |
| 7,236,584 B2 | 6/2007 | Torba |
| 7,245,716 B2 | 7/2007 | Brown et al. |
| 7,245,719 B2 | 7/2007 | Kawada et al. |
| 7,266,251 B2 | 9/2007 | Rowe |
| 7,269,253 B1 | 9/2007 | Wu et al. |
| 7,353,388 B1 | 4/2008 | Gilman et al. |
| 7,398,224 B2 | 7/2008 | Cooper |
| 7,593,521 B2 | 9/2009 | Becerra et al. |
| 7,676,034 B1 | 3/2010 | Wu et al. |
| 7,725,339 B1 | 5/2010 | Aykin |
| 7,734,032 B1 | 6/2010 | Kiefhaber et al. |
| 7,798,876 B2 | 9/2010 | Mix |
| 7,826,597 B2 | 11/2010 | Berner et al. |
| 7,864,944 B2 | 1/2011 | Khouri et al. |
| 7,899,177 B1 | 3/2011 | Bruening et al. |
| 7,916,858 B1 | 3/2011 | Heller et al. |
| 7,940,917 B2 | 5/2011 | Lauridsen et al. |
| 7,961,866 B1 | 6/2011 | Boutcher et al. |
| 7,995,717 B2 | 8/2011 | Conway et al. |
| 8,000,989 B1 | 8/2011 | Kiefhaber et al. |
| 8,010,607 B2 | 8/2011 | McCormack et al. |
| 8,094,790 B2 | 1/2012 | Conway et al. |
| 8,126,133 B1 | 2/2012 | Everingham et al. |
| 8,140,441 B2 | 3/2012 | Cases et al. |
| 8,175,253 B2 | 5/2012 | Knott et al. |
| 8,229,102 B2 | 7/2012 | Knott et al. |
| 8,249,245 B2 | 8/2012 | Jay et al. |
| 8,295,471 B2 | 10/2012 | Spottiswoode et al. |
| 8,300,798 B1 | 10/2012 | Wu et al. |
| 8,359,219 B2 | 1/2013 | Chishti et al. |
| 8,433,597 B2 | 4/2013 | Chishti et al. |
| 8,472,611 B2 | 6/2013 | Chishti |
| 8,565,410 B2 | 10/2013 | Chishti et al. |
| 8,634,542 B2 | 1/2014 | Spottiswoode et al. |
| 8,644,490 B2 | 2/2014 | Stewart |
| 8,670,548 B2 | 3/2014 | Xie et al. |
| 8,699,694 B2 | 4/2014 | Chishti et al. |
| 8,712,821 B2 | 4/2014 | Spottiswoode |
| 8,718,271 B2 | 5/2014 | Spottiswoode |
| 8,724,797 B2 | 5/2014 | Chishti et al. |
| 8,731,178 B2 | 5/2014 | Chishti et al. |
| 8,737,595 B2 | 5/2014 | Chishti et al. |
| 8,750,488 B2 | 6/2014 | Spottiswoode et al. |
| 8,761,380 B2 | 6/2014 | Kohler et al. |
| 8,781,100 B2 | 7/2014 | Spottiswoode et al. |
| 8,781,106 B2 | 7/2014 | Afzal |
| 8,792,630 B2 | 7/2014 | Chishti et al. |
| 8,824,658 B2 | 9/2014 | Chishti |
| 8,831,207 B1 | 9/2014 | Agarwal |
| 8,856,869 B1 | 10/2014 | Brinskelle |
| 8,879,715 B2 | 11/2014 | Spottiswoode et al. |
| 8,903,079 B2 | 12/2014 | Xie et al. |
| 8,913,736 B2 | 12/2014 | Kohler et al. |
| 8,929,537 B2 | 1/2015 | Chishti et al. |
| 8,938,063 B1 | 1/2015 | Hackbarth et al. |
| 8,995,647 B2 | 3/2015 | Li et al. |
| 9,020,137 B2 | 4/2015 | Chishti et al. |
| 9,025,757 B2 | 5/2015 | Spottiswoode et al. |
| 9,215,323 B2 | 12/2015 | Chishti |
| 9,277,055 B2 | 3/2016 | Spottiswoode et al. |
| 9,300,802 B1 | 3/2016 | Chishti |
| 9,426,296 B2 | 8/2016 | Chishti et al. |
| 9,712,676 B1 | 7/2017 | Chishti |
| 9,712,679 B2 | 7/2017 | Chishti et al. |
| 9,781,269 B2 | 10/2017 | Chishti et al. |
| 9,787,841 B2 | 10/2017 | Chishti et al. |
| 9,930,180 B1 | 3/2018 | Kan et al. |
| 9,942,405 B1 | 4/2018 | Kan et al. |
| RE46,986 E | 8/2018 | Chishti et al. |
| RE47,201 E | 1/2019 | Chishti et al. |
| 2001/0032120 A1 | 10/2001 | Stuart et al. |
| 2001/0044896 A1 | 11/2001 | Schwartz et al. |
| 2002/0018554 A1 | 2/2002 | Jensen et al. |
| 2002/0046030 A1 | 4/2002 | Haritsa et al. |
| 2002/0059164 A1 | 5/2002 | Shtivelman |
| 2002/0082736 A1 | 6/2002 | Lech et al. |
| 2002/0110234 A1 | 8/2002 | Walker et al. |
| 2002/0111172 A1 | 8/2002 | DeWolf et al. |
| 2002/0131399 A1 | 9/2002 | Philonenko |
| 2002/0138285 A1 | 9/2002 | DeCotiis et al. |
| 2002/0143599 A1 | 10/2002 | Nourbakhsh et al. |
| 2002/0161765 A1 | 10/2002 | Kundrot et al. |
| 2002/0184069 A1 | 12/2002 | Kosiba et al. |
| 2002/0196845 A1 | 12/2002 | Richards et al. |
| 2003/0002653 A1 | 1/2003 | Uckun |
| 2003/0081757 A1 | 5/2003 | Mengshoel et al. |
| 2003/0095652 A1 | 5/2003 | Mengshoel et al. |
| 2003/0169870 A1 | 9/2003 | Stanford |
| 2003/0174830 A1 | 9/2003 | Boyer et al. |
| 2003/0217016 A1 | 11/2003 | Pericle |
| 2004/0028211 A1 | 2/2004 | Culp et al. |
| 2004/0057416 A1 | 3/2004 | McCormack |
| 2004/0096050 A1 | 5/2004 | Das et al. |
| 2004/0098274 A1 | 5/2004 | Dezonno et al. |
| 2004/0101127 A1 | 5/2004 | Dezonno et al. |

(56) References Cited

U.S. PATENT DOCUMENTS

| | | |
|---|---|---|
| 2004/0109555 A1 | 6/2004 | Williams |
| 2004/0133434 A1 | 7/2004 | Szlam et al. |
| 2004/0210475 A1 | 10/2004 | Starnes et al. |
| 2004/0230438 A1 | 11/2004 | Pasquale et al. |
| 2004/0267816 A1 | 12/2004 | Russek |
| 2005/0013428 A1 | 1/2005 | Walters |
| 2005/0043986 A1 | 2/2005 | McConnell et al. |
| 2005/0047581 A1 | 3/2005 | Shaffer et al. |
| 2005/0047582 A1 | 3/2005 | Shaffer et al. |
| 2005/0071223 A1 | 3/2005 | Jain et al. |
| 2005/0129212 A1 | 6/2005 | Parker |
| 2005/0135593 A1 | 6/2005 | Becerra et al. |
| 2005/0135596 A1 | 6/2005 | Zhao |
| 2005/0187802 A1 | 8/2005 | Koeppel |
| 2005/0195960 A1 | 9/2005 | Shaffer et al. |
| 2005/0286709 A1 | 12/2005 | Horton et al. |
| 2006/0098803 A1 | 5/2006 | Bushey et al. |
| 2006/0110052 A1 | 5/2006 | Finlayson |
| 2006/0124113 A1 | 6/2006 | Roberts |
| 2006/0184040 A1 | 8/2006 | Keller et al. |
| 2006/0222164 A1 | 10/2006 | Contractor et al. |
| 2006/0233346 A1 | 10/2006 | McIlwaine et al. |
| 2006/0262918 A1 | 11/2006 | Karnalkar et al. |
| 2006/0262922 A1 | 11/2006 | Margulies et al. |
| 2007/0004384 A1* | 1/2007 | Anupam ............. H04M 3/4285 455/414.1 |
| 2007/0036323 A1 | 2/2007 | Travis |
| 2007/0071222 A1 | 3/2007 | Flockhart et al. |
| 2007/0116240 A1 | 5/2007 | Foley et al. |
| 2007/0121602 A1 | 5/2007 | Sin et al. |
| 2007/0121829 A1 | 5/2007 | Tal et al. |
| 2007/0136342 A1 | 6/2007 | Singhai et al. |
| 2007/0153996 A1 | 7/2007 | Hansen |
| 2007/0154007 A1 | 7/2007 | Bernhard |
| 2007/0174111 A1 | 7/2007 | Anderson et al. |
| 2007/0198322 A1 | 8/2007 | Bourne et al. |
| 2007/0219816 A1 | 9/2007 | Van Luchene et al. |
| 2007/0274502 A1 | 11/2007 | Brown |
| 2008/0002823 A1 | 1/2008 | Fama et al. |
| 2008/0008309 A1 | 1/2008 | Dezonno et al. |
| 2008/0046386 A1 | 2/2008 | Pieraccinii et al. |
| 2008/0065476 A1 | 3/2008 | Klein et al. |
| 2008/0118052 A1 | 5/2008 | Houmaidi et al. |
| 2008/0144803 A1 | 6/2008 | Jaiswal et al. |
| 2008/0152122 A1 | 6/2008 | Idan et al. |
| 2008/0181389 A1 | 7/2008 | Bourne et al. |
| 2008/0199000 A1 | 8/2008 | Su et al. |
| 2008/0205611 A1 | 8/2008 | Jordan et al. |
| 2008/0205620 A1* | 8/2008 | Odinak ............... H04M 3/4285 379/215.01 |
| 2008/0267386 A1 | 10/2008 | Cooper |
| 2008/0273687 A1 | 11/2008 | Knott et al. |
| 2009/0043670 A1 | 2/2009 | Johansson et al. |
| 2009/0086933 A1 | 4/2009 | Patel et al. |
| 2009/0190740 A1 | 7/2009 | Chishti et al. |
| 2009/0190743 A1 | 7/2009 | Spottiswoode |
| 2009/0190744 A1 | 7/2009 | Xie et al. |
| 2009/0190745 A1 | 7/2009 | Xie et al. |
| 2009/0190746 A1 | 7/2009 | Chishti et al. |
| 2009/0190747 A1 | 7/2009 | Spottiswoode |
| 2009/0190748 A1 | 7/2009 | Chishti et al. |
| 2009/0190749 A1 | 7/2009 | Xie et al. |
| 2009/0190750 A1 | 7/2009 | Xie et al. |
| 2009/0232294 A1 | 9/2009 | Xie et al. |
| 2009/0234710 A1 | 9/2009 | Belgaied Hassine et al. |
| 2009/0245493 A1 | 10/2009 | Chen et al. |
| 2009/0249083 A1 | 10/2009 | Forlenza et al. |
| 2009/0304172 A1 | 12/2009 | Becerra et al. |
| 2009/0318111 A1 | 12/2009 | Desai et al. |
| 2009/0323921 A1 | 12/2009 | Spottiswoode et al. |
| 2010/0020959 A1 | 1/2010 | Spottiswoode |
| 2010/0020961 A1 | 1/2010 | Spottiswoode |
| 2010/0054431 A1 | 3/2010 | Jaiswal et al. |
| 2010/0054452 A1 | 3/2010 | Afzal |
| 2010/0054453 A1 | 3/2010 | Stewart |
| 2010/0086120 A1 | 4/2010 | Brussat et al. |
| 2010/0111285 A1 | 5/2010 | Chishti |
| 2010/0111286 A1 | 5/2010 | Chishti |
| 2010/0111287 A1 | 5/2010 | Xie et al. |
| 2010/0111288 A1 | 5/2010 | Afzal et al. |
| 2010/0142698 A1 | 6/2010 | Spottiswoode et al. |
| 2010/0158238 A1 | 6/2010 | Saushkin |
| 2010/0183138 A1 | 7/2010 | Spottiswoode et al. |
| 2011/0022357 A1 | 1/2011 | Vock et al. |
| 2011/0031112 A1 | 2/2011 | Birang et al. |
| 2011/0069821 A1 | 3/2011 | Korolev et al. |
| 2011/0125048 A1 | 5/2011 | Causevic et al. |
| 2012/0051532 A1* | 3/2012 | Pande .................. H04M 3/465 379/201.05 |
| 2012/0051536 A1 | 3/2012 | Chishti et al. |
| 2012/0051537 A1 | 3/2012 | Chishti et al. |
| 2012/0224680 A1 | 9/2012 | Spottiswoode et al. |
| 2012/0278136 A1 | 11/2012 | Flockhart et al. |
| 2013/0003959 A1 | 1/2013 | Nishikawa et al. |
| 2013/0251137 A1 | 9/2013 | Chishti et al. |
| 2013/0287202 A1 | 10/2013 | Flockhart et al. |
| 2013/0297687 A1* | 11/2013 | Speeney ............... G06Q 50/01 709/204 |
| 2014/0044246 A1 | 2/2014 | Klemm et al. |
| 2014/0079210 A1 | 3/2014 | Kohler et al. |
| 2014/0119531 A1 | 5/2014 | Tuchman et al. |
| 2014/0119533 A1 | 5/2014 | Spottiswoode et al. |
| 2014/0270133 A1 | 9/2014 | Conway et al. |
| 2014/0341370 A1 | 11/2014 | Li et al. |
| 2015/0055772 A1 | 2/2015 | Klemm et al. |
| 2015/0281448 A1 | 10/2015 | Putra et al. |
| 2016/0050312 A1* | 2/2016 | Ronketti ............ H04M 3/4285 455/414.1 |
| 2016/0080573 A1 | 3/2016 | Chishti |
| 2017/0004081 A1 | 1/2017 | Hayakawa et al. |

FOREIGN PATENT DOCUMENTS

| | | |
|---|---|---|
| AU | 2009311534 B2 | 8/2014 |
| AU | 2015203175 A1 | 7/2015 |
| AU | 2015243001 A1 | 11/2015 |
| CN | 101093590 A | 12/2007 |
| CN | 102164073 A | 8/2011 |
| CN | 102390184 A | 3/2012 |
| CN | 102555536 A | 7/2012 |
| CN | 202965525 U | 6/2013 |
| CN | 203311505 U | 11/2013 |
| CN | 102301688 B | 5/2014 |
| CN | 102017591 B | 11/2014 |
| EP | 0 493 292 A2 | 7/1992 |
| EP | 0863651 A2 | 9/1998 |
| EP | 0 949 793 A1 | 10/1999 |
| EP | 1011974 A1 | 6/2000 |
| EP | 1 032 188 A1 | 8/2000 |
| EP | 1107557 A2 | 6/2001 |
| EP | 1335572 A2 | 8/2003 |
| JP | 11-098252 A | 4/1999 |
| JP | 2000-069168 A | 3/2000 |
| JP | 2000-078291 A | 3/2000 |
| JP | 2000-078292 A | 3/2000 |
| JP | 2000-092213 A | 3/2000 |
| JP | 2000-507420 A | 6/2000 |
| JP | 2000-236393 A | 8/2000 |
| JP | 2000-253154 A | 9/2000 |
| JP | 2001-292236 A | 10/2001 |
| JP | 2001-518753 A | 10/2001 |
| JP | 2002-069168 A | 3/2002 |
| JP | 2002-297900 A | 10/2002 |
| JP | 3366565 B2 | 1/2003 |
| JP | 2003-187061 A | 7/2003 |
| JP | 2004-056517 A | 2/2004 |
| JP | 2004-227228 A | 8/2004 |
| JP | 2006-345132 A | 12/2006 |
| JP | 2007-324708 A | 12/2007 |
| JP | 2009-081627 A | 4/2009 |
| JP | 2011-511533 A | 4/2011 |
| JP | 2011-511536 A | 4/2011 |
| JP | 2012-075146 A | 4/2012 |
| JP | 5421928 B2 | 2/2014 |

(56) References Cited

FOREIGN PATENT DOCUMENTS

| | | |
|---|---|---|
| JP | 5631326 B2 | 11/2014 |
| JP | 5649575 B2 | 1/2015 |
| JP | 2015-514371 A | 5/2015 |
| MX | 316118 | 12/2013 |
| MX | 322251 | 7/2014 |
| NZ | 587100 B | 10/2013 |
| NZ | 587101 B | 10/2013 |
| NZ | 591486 B | 1/2014 |
| NZ | 592781 B | 3/2014 |
| PH | 1-2010-501704 | 2/2014 |
| PH | 1-2010-501705 | 2/2015 |
| WO | WO-1999/017517 A1 | 4/1999 |
| WO | WO-00/070849 A2 | 11/2000 |
| WO | WO-2001/063894 A2 | 8/2001 |
| WO | WO-2006/124113 A2 | 11/2006 |
| WO | WO-2008/124113 A1 | 10/2008 |
| WO | WO-2009/097018 A1 | 8/2009 |
| WO | WO-2009/097210 A1 | 8/2009 |
| WO | WO-2010/053701 A2 | 5/2010 |
| WO | WO-2011/081514 A1 | 7/2011 |
| WO | WO-2013/148453 A1 | 10/2013 |
| WO | WO-2016/048290 A1 | 3/2016 |

OTHER PUBLICATIONS

Anonymous. (2006) "Performance Based Routing in Profit Call Centers," The Decision Makers' Direct, located at www.decisioncraft.com, Issue Jun. 2002 (3 pages).
Cleveland, William S., "Robust Locally Weighted Regression and Smoothing Scatterplots," Journal of the American Statistical Association, vol. 74, No. 368, pp. 829-836 (Dec. 1979).
Gans, N. et al. (2003), "Telephone Call Centers: Tutorial, Review and Research Prospects," Manufacturing & Service Operations Management, vol. 5, No. 2, pp. 79-141, 84 pages.
International Search Report and Written Opinion issued by the European Patent Office as International Searching Authority for International Application No. PCT/IB2016/001762 dated Feb. 20, 2017 (15 pages).
International Preliminary Report on Patentability issued in connection with PCT Application No. PCT/US2009/066254 dated Jun. 14, 2011 (6 pages).
International Search Report and Written Opinion issued by the European Patent Office as International Searching Authority for International Application No. PCT/IB2016/001776 dated Mar. 3, 2017 (16 pages).
International Search Report issued in connection with International Application No. PCT/US13/33268 dated May 31, 2013 (2 pages).
International Search Report issued in connection with PCT Application No. PCT/US/2009/054352 dated Mar. 12, 2010, 5 pages.
International Search Report issued in connection with PCT Application No. PCT/US2008/077042 dated Mar. 13, 2009 (3 pages).
International Search Report issued in connection with PCT Application No. PCT/US2009/031611 dated Jun. 3, 2009 (5 pages).
International Search Report issued in connection with PCT Application No. PCT/US2009/066254 dated Feb. 24, 2010 (4 pages).
International Search Report issued in connection with PCT/US2009/061537 dated Jun. 7, 2010 (5 pages).
International Search Report issued in connection with PCT/US2013/033261 dated Jun. 14, 2013 (3 pages).
International Search Report issued in connection with PCT/US2013/33265 dated Jul. 9, 2013 (2 pages).
International Search Report and Written Opinion issued by the European Patent Office as International Searching Authority for International Application No. PCT/IB2018/000434 dated Jun. 20, 2018 (14 pages).
Koole, G. (2004). "Performance Analysis and Optimization in Customer Contact Centers," Proceedings of the Quantitative Evaluation of Systems, First International Conference, Sep. 27-30, 2004 (4 pages).
Koole, G. et al. (Mar. 6, 2006). "An Overview of Routing and Staffing Algorithms in Multi-Skill Customer Contact Centers," Manuscript, 42 pages.
Nocedal, J. and Wright, S. J., "Numerical Optimization," Chapter 16 Quadratic Programming, pp. 448-496 (2006).
Ntzoufras, "Bayesian Modeling Using Winbugs". Wiley Interscience, Chapter 5, Normal Regression Models, Oct. 18, 2007, pp. 155-220 (67 pages).
Press, W. H. and Rybicki, G. B., "Fast Algorithm for Spectral Analysis of Unevenly Sampled Data," The Astrophysical Journal, vol. 338, pp. 277-280 (Mar. 1, 1989).
Riedmiller, M. et al. (1993). "A Direct Adaptive Method for Faster Back Propagation Learning: The RPROP Algorithm," 1993 IEEE International Conference on Neural Networks, San Francisco, CA, Mar. 28-Apr. 1, 1993, 1:586-591.
Stanley et al., "Improving call center operations using performance-based routing strategies," Calif. Journal of Operations Management, 6(1), 24-32, Feb. 2008; retrieved from http://userwww.sfsu.edu/saltzman/Publist.html (9 pages).
Written Opinion of the International Searching Authority issued in connection with PCT Application No. PCT/US2008/077042 dated Mar. 13, 2009, 6 pages.
Written Opinion of the International Searching Authority issued in connection with International Application No. PCT/US13/33268 dated May 31, 2013, 7 pages.
Written Opinion of the International Searching Authority issued in connection with PCT Application No. PCT/US/2009/054352 dated Mar. 12, 2010, 5 pages.
Written Opinion of the International Searching Authority issued in connection with PCT Application No. PCT/US2009/031611 dated Jun. 3, 2009, 7 pages.
Written Opinion of the International Searching Authority issued in connection with PCT Application No. PCT/US2009/066254 dated Feb. 24, 2010, 5 pages.
Written Opinion of the International Searching Authority issued in connection with PCT/US2009/061537 dated Jun. 7, 2010, 10 pages.
Written Opinion of the International Searching Authority issued in connection with PCT/US2013/033261 dated Jun. 14, 2013, 7 pages.
Written Opinion of the International Searching Authority issued in connection with PCT/US2013/33265 dated Jul. 9, 2013, 7 pages.
Extended European Search Report issued by the European Patent Office for European Application No. 17154781.3 dated May 4, 2017 (7 pages).
International Search Report and Written Opinion issued by the European Patent Office as International Searching Authority for International Application No. PCT/IB2017/000570 dated Jun. 30, 2017 (13 pages).
Extended European Search Report issued by the European Patent Office for European Application No. 17171761.4 dated Aug. 30, 2017 (8 pages).
Extended European Search Report issued by the European Patent Office for European Application No. 18168620.5 dated Jun. 12, 2018 (9 pages).

* cited by examiner

TECHNIQUES FOR BEHAVIORAL PAIRING IN A CONTACT CENTER SYSTEM

FIELD OF THE DISCLOSURE

This disclosure generally relates to pairing contacts and agents in contact centers and, more particularly, to techniques for behavioral pairing in a contact center system.

BACKGROUND OF THE DISCLOSURE

A typical contact center algorithmically assigns contacts arriving at the contact center to agents available to handle those contacts. At times, the contact center may have agents available and waiting for assignment to inbound or outbound contacts (e.g., telephone calls, Internet chat sessions, email). At other times, the contact center may have contacts waiting in one or more queues for an agent to become available for assignment.

In some typical contact centers, contacts are assigned to agents ordered based on time of arrival, and agents receive contacts ordered based on the time when those agents became available. This strategy may be referred to as a "first-in, first-out," "FIFO," or "round-robin" strategy. In other typical contact centers, other strategies may be used, such as "performance-based routing," or a "PBR" strategy.

In other, more advanced contact centers, contacts are paired with agents using a "behavioral pairing," or a "BP" strategy, under which contacts and agents may be deliberately (preferentially) paired in a fashion that enables the assignment of subsequent contact-agent pairs such that when the benefits of all the assignments under a BP strategy are totaled they may exceed those of FIFO and other strategies such as performance-based routing ("PBR") strategies. BP is designed to encourage balanced utilization of agents within a skill queue while nevertheless simultaneously improving overall contact center performance beyond what FIFO or PBR methods will allow. This is a remarkable achievement inasmuch as BP acts on the same calls and same agents as FIFO or PBR methods, utilizes agents approximately evenly as FIFO provides, and yet improves overall contact center performance. BP is described in, e.g., U.S. Pat. No. 9,300,802, which is incorporated by reference herein. Additional information about these and other features regarding the pairing or matching modules (sometimes also referred to as "SATMAP," "routing system," "routing engine," etc.) is described in, for example, U.S. Pat. No. 8,879,715, which is incorporated by reference herein.

In some typical contact centers, contacts may be presented with hold music or informational messages while the contacts are waiting to be connected to an agent. Some of the contacts may not enjoy the default hold activity, and the hold activity provides no usable information to a BP strategy.

In view of the foregoing, it may be understood that there may be a need for a system that enables contact centers to present preferred hold activities to contacts, as well as to use information about preferred hold activities in a pairing strategy, so as to improve the efficiency and performance of pairing strategies that are designed to choose among multiple possible pairings, such as a BP strategy.

SUMMARY OF THE DISCLOSURE

Techniques for behavioral pairing in a contact center system are disclosed. In one particular embodiment, the techniques may be realized as a method for behavioral pairing in a contact center system comprising determining, by at least one computer processor communicatively coupled to and configured to operate in the contact center system, a preferred hold activity for a contact; presenting, by the at least one computer processor, the preferred hold activity to the contact; and assigning, by the at least one computer processor, the contact to an available agent based on the preferred hold activity.

In accordance with other aspects of this particular embodiment, the preferred hold activity may be playing music preferred by the contact.

In accordance with other aspects of this particular embodiment, the preferred hold activity may be delivering informational messages preferred by the contact.

In accordance with other aspects of this particular embodiment, determining the preferred hold activity may comprise receiving, by the at least one computer processor, input from the contact about the preferred hold activity.

In accordance with other aspects of this particular embodiment, assigning the contact to the available agent may comprise using, by the at least one computer processor, a behavioral pairing strategy.

In another particular embodiment, the techniques may be realized as a method for behavioral pairing in a contact center system comprising: determining, by at least one computer processor communicatively coupled to and configured to operate in the contact center system, a preferred hold activity for a contact; presenting, by the at least one computer processor, the preferred hold activity to the contact; postponing, by the at least one computer processor, assigning the contact based on the preferred hold activity; and after postponing, assigning, by the at least one computer processor, the contact to an available agent of a plurality of available agents using a behavioral pairing strategy.

In accordance with other aspects of this particular embodiment, the behavioral pairing strategy may incorporate information about the preferred hold activity.

In accordance with other aspects of this particular embodiment, the method may further comprise extending, by the at least one computer processor, a default service level agreement for the contact based on information about the preferred hold activity.

In accordance with other aspects of this particular embodiment, the preferred hold activity may be listening to music preferred by the contact.

In accordance with other aspects of this particular embodiment, the postponing may be based on a duration of the preferred hold activity.

In another particular embodiment, the techniques may be realized as a system for behavioral pairing in a contact center system comprising at least one computer processor communicatively coupled to and configured to operate in the contact center system, wherein the at least one computer processor is further configured to perform the steps in the above-discussed methods.

In another particular embodiment, the techniques may be realized as an article of manufacture for behavioral pairing in a contact center system comprising a non-transitory processor readable medium and instructions stored on the medium, wherein the instructions are configured to be readable from the medium by at least one computer processor communicatively coupled to and configured to operate in the contact center system and thereby cause the at least one computer processor to operate to perform the steps in the above-discussed methods.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

To facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION

A typical contact center algorithmically assigns contacts arriving at the contact center to agents available to handle those contacts. At times, the contact center may have agents available and waiting for assignment to inbound or outbound contacts (e.g., telephone calls, Internet chat sessions, email). At other times, the contact center may have contacts waiting in one or more queues for an agent to become available for assignment.

In some typical contact centers, contacts are assigned to agents ordered based on time of arrival, and agents receive contacts ordered based on the time when those agents became available. This strategy may be referred to as a "first-in, first-out," "FIFO," or "round-robin" strategy. In other typical contact centers, other strategies may be used, such as "performance-based routing," or a "PBR" strategy.

In other, more advanced contact centers, contacts are paired with agents using a "behavioral pairing," or a "BP" strategy, under which contacts and agents may be deliberately (preferentially) paired in a fashion that enables the assignment of subsequent contact-agent pairs such that when the benefits of all the assignments under a BP strategy are totaled they may exceed those of FIFO and other strategies such as performance-based routing ("PBR") strategies. BP is designed to encourage balanced utilization of agents within a skill queue while nevertheless simultaneously improving overall contact center performance beyond what FIFO or PBR methods will allow. This is a remarkable achievement inasmuch as BP acts on the same calls and same agents as FIFO or PBR methods, utilizes agents approximately evenly as FIFO provides, and yet improves overall contact center performance. BP is described in, e.g., U.S. Pat. No. 9,300, 802, which is incorporated by reference herein. Additional information about these and other features regarding the pairing or matching modules (sometimes also referred to as "SATMAP," "routing system," "routing engine," etc.) is described in, for example, U.S. Pat. No. 8,879,715, which is incorporated by reference herein.

In some typical contact centers, contacts may be presented with hold music or informational messages while the contacts are waiting to be connected to an agent. Some of the contacts may not enjoy the default hold activity, and the hold activity provides no usable information to a BP strategy.

In view of the foregoing, it may be understood that there may be a need for a system that enables contact centers to present preferred hold activities to contacts, as well as to use information about preferred hold activities in a pairing strategy, so as to improve the efficiency and performance of pairing strategies that are designed to choose among multiple possible pairings, such as a BP strategy.

Figure 1:
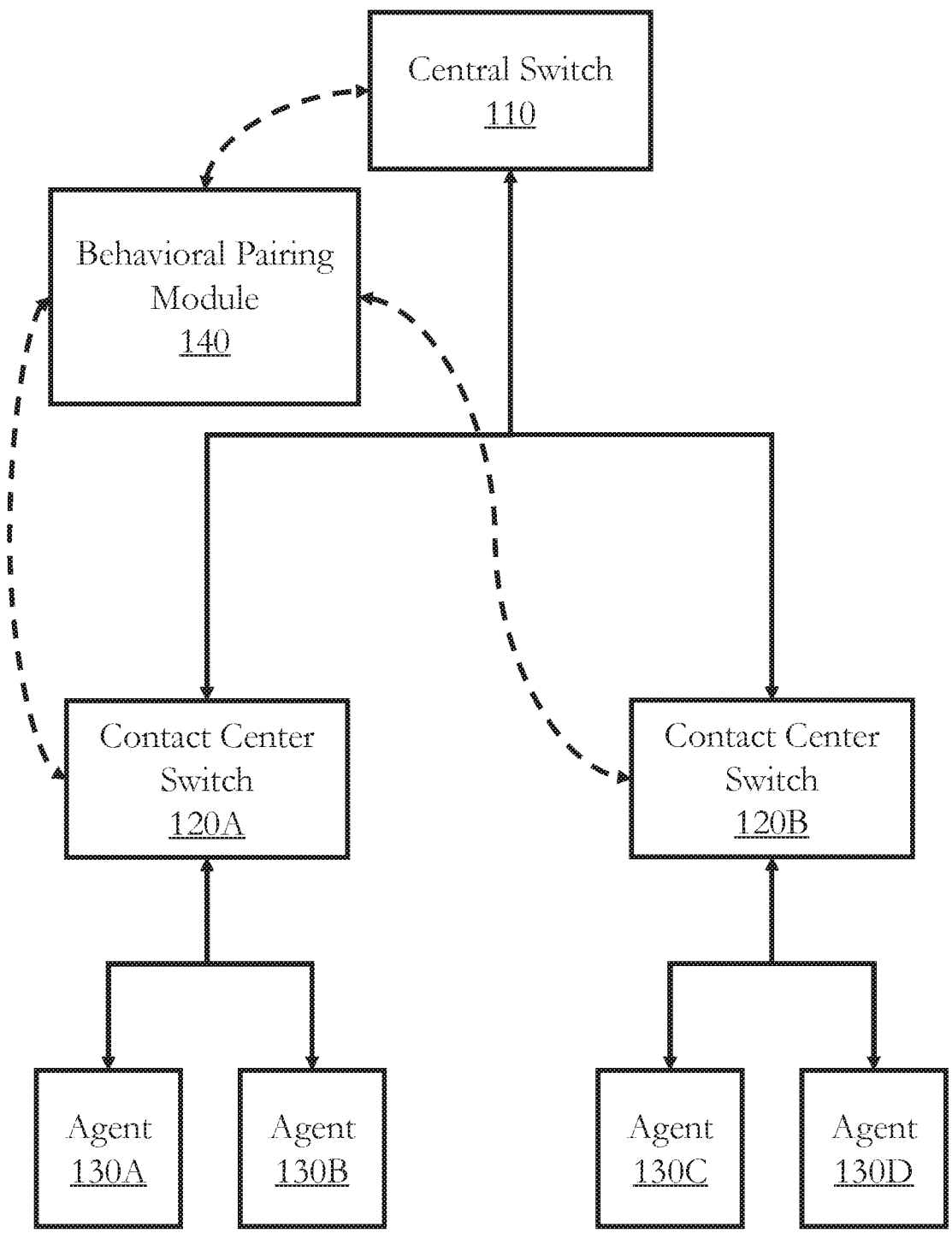
FIG. 1 shows a block diagram of a contact center system according to embodiments of the present disclosure.

FIG. 1 shows a block diagram of a contact center system 100 according to embodiments of the present disclosure. The description herein describes network elements, computers, and/or components of a system and method for simulating contact center systems that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

As shown in FIG. 1, the contact center system 100 may include a central switch 110. The central switch 110 may receive incoming contacts (e.g., callers) or support outbound connections to contacts via a telecommunications network (not shown). The central switch 110 may include contact routing hardware and software for helping to route contacts among one or more contact centers, or to one or more PBX/ACDs or other queuing or switching components, including other Internet-based, cloud-based, or otherwise networked contact-agent hardware or software-based contact center solutions.

The central switch 110 may not be necessary such as if there is only one contact center, or if there is only one PBX/ACD routing component, in the contact center system 100. If more than one contact center is part of the contact center system 100, each contact center may include at least one contact center switch (e.g., contact center switches 120A and 120B). The contact center switches 120A and 120B may be communicatively coupled to the central switch 110. In embodiments, various topologies of routing and network components may be configured to implement the contact center system.

Each contact center switch for each contact center may be communicatively coupled to a plurality (or "pool") of agents. Each contact center switch may support a certain number of agents (or "seats") to be logged in at one time. At any given time, a logged-in agent may be available and waiting to be connected to a contact, or the logged-in agent may be unavailable for any of a number of reasons, such as being connected to another contact, performing certain post-call functions such as logging information about the call, or taking a break.

In the example of FIG. 1, the central switch 110 routes contacts to one of two contact centers via contact center switch 120A and contact center switch 120B, respectively.

Each of the contact center switches 120A and 120B are shown with two agents each. Agents 130A and 130B may be logged into contact center switch 120A, and agents 130C and 130D may be logged into contact center switch 120B.

The contact center system 100 may also be communicatively coupled to an integrated service from, for example, a third-party vendor. In the example of FIG. 1, behavioral pairing module 140 may be communicatively coupled to one or more switches in the switch system of the contact center system 100, such as central switch 110, contact center switch 120A, or contact center switch 120B. In some embodiments, switches of the contact center system 100 may be communicatively coupled to multiple behavioral pairing modules. In some embodiments, behavioral pairing module 140 may be embedded within a component of a contact center system (e.g., embedded in or otherwise integrated with a switch, or a "BP switch"). The behavioral pairing module 140 may receive information from a switch (e.g., contact center switch 120A) about agents logged into the switch (e.g., agents 130A and 130B) and about incoming contacts via another switch (e.g., central switch 110) or, in some embodiments, from a network (e.g., the Internet or a telecommunications network) (not shown).

A contact center may include multiple pairing modules (e.g., a BP module and a FIFO module) (not shown), and one or more pairing modules may be provided by one or more different vendors. In some embodiments, one or more pairing modules may be components of behavioral pairing module 140 or one or more switches such as central switch 110 or contact center switches 120A and 120B. In some embodiments, a BP module may determine which pairing module may handle pairing for a particular contact. For example, the BP module may alternate between enabling pairing via the BP module and enabling pairing with the FIFO module. In other embodiments, one pairing module (e.g., the BP module) may be configured to emulate other pairing strategies. For example, a BP module, or a BP component integrated with BP components in the BP module, may determine whether the BP module may use BP pairing or emulated FIFO pairing for a particular contact. In this case, "BP on" may refer to times when the BP module is applying the BP pairing strategy, and "BP off" may refer to other times when the BP module is applying a different pairing strategy (e.g., FIFO).

In some embodiments, regardless of whether pairing strategies are handled by separate modules, or if some pairing strategies are emulated within a single pairing module, the single pairing module may be configured to monitor and store information about pairings made under any or all pairing strategies. For example, a BP module may observe and record data about FIFO pairings made by a FIFO module, or the BP module may observe and record data about emulated FIFO pairings made by a BP module operating in FIFO emulation mode.

The switches (e.g., central switch 110, may include contact communication equipment capable of delivering a hold activity to the contact. For example, in a call center, the central switch 110 may retrieve and play hold music or a hold message to the contact. In some embodiments, the central switch 110 may be configured to receive input from the contact regarding the hold activity. For example, the central switch 110 may receive a selection of preferred hold music from the contact and play the preferred hold music. In some embodiments, the BP module 140 or a similar module may be configured to retrieve to receive the input from the contact or provide information to a switch (e.g., central switch 110) about the hold activity that should be presented.

Figure 2:
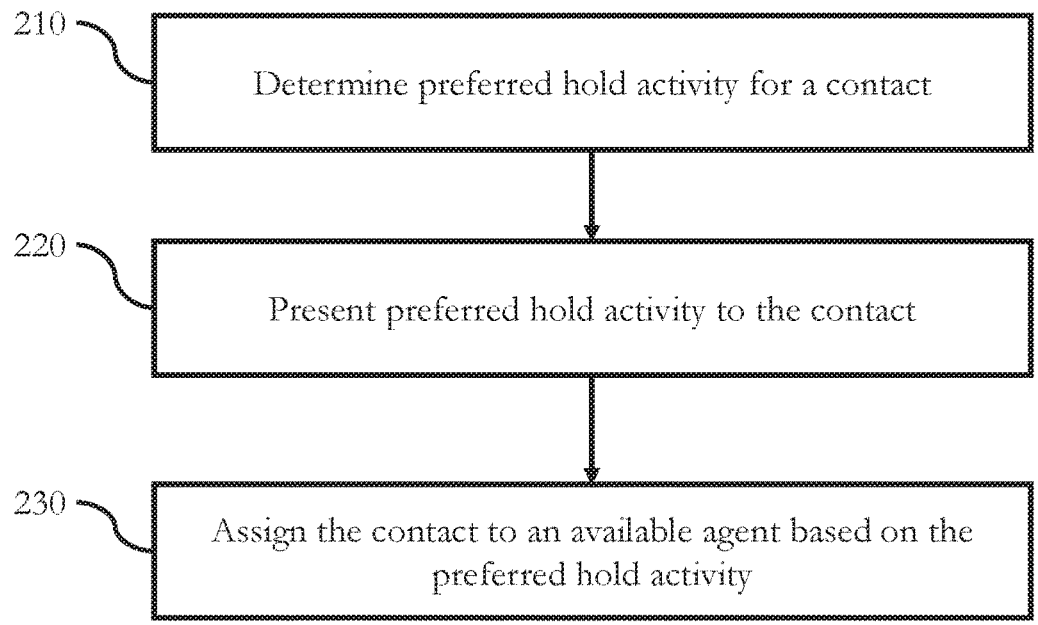
FIG. 2 shows a flow diagram of a behavioral pairing method according to embodiments of the present disclosure.

FIG. 2 shows a flow diagram of a behavioral pairing method 200 according to embodiments of the present disclosure. Behavioral pairing method 200 may begin at block 210.

At block 210, a preferred hold activity for a contact may be determined. In some embodiments, input is received from the contact. For example, in a call center, a caller may be given a choice of several songs or several genres of music, and the contact may make a selection, such as by pressing a button or speaking to an interactive voice response (IVR) system. In some embodiments, the contact's selection may be transmitted to another module communicatively coupled to the contact center system such as BP module 140 (FIG. 1). In some embodiments, the contact center system may be configured to enable a contact to select no hold activity (e.g., a caller will hear only silence), beeping, or ambient noises (e.g., images or sounds from a beach or rainforest). In some embodiments, the contact may be offered the option of requesting a callback before, during, or after selection of the contact's preferred hold activity.

In other embodiments, the contact's preferences may already be known to the contact center system. For example, the contact center system may have stored a contact's preferences from an earlier interaction with the contact. In other embodiments, the contact center system may retrieve information from a third-party such as a social network or music streaming service. For example, the contact may have previously granted permission for the contact center system to connect to a music streaming service and retrieve a preferred song, album, playlist, etc. In some embodiments, the option to select a preferred hold activity may be enabled in return for contacts that have previously provided other additional data (including data unrelated to the preferred hold activity) that may be used to inform a BP model.

Having determined the preferred hold activity for the contact, the behavioral pairing method 200 may proceed to block 220.

At block 220, the preferred hold activity may be presented to the contact. For example, the contact's selected or otherwise preferred song may be played as hold music. In some embodiments, the contact center system may be configured to allow the contact to return to block 210 to change the hold activity. In some embodiments, multiple preferred hold activities may be presented to the contact. For example, one or more informational messages may be presented to the contact before, during, or after one or more preferred songs have been played. In some embodiments, the preferred hold activity may be provided via a connection to a third-party service provider. For example, a preferred song may be streamed via a third-party music streaming service. Having presented the preferred hold activity to the contact, the behavioral pairing method 200 may proceed to block 230.

At block 230, the contact may be assigned to an available agent based on the preferred hold activity. In some embodiments, the assignment may be made using a BP strategy that incorporates information about the preferred hold activity in its BP model to preferably pair the contact with an agent that will lead to the preferred outcome being optimized by the BP strategy. By incorporating information about the preferred hold activity, the BP strategy may achieve improved overall performance for the contact center system than a BP strategy that did not have the advantage of information about a contact's preferred hold activity. In some embodiments, the BP strategy may incorporate additional information related to the preferred hold activity. For example, the BP module may retrieve additional information from the contact's social network or music streaming service about the contact, such as a contact's listening history, playlist information, preferred artists and bands, etc.

In some embodiments, the assignment of the contact to an available agent may be output to one or more other modules of the contact center system. Presentation of the hold activity may end, and a connection may be established between the contact and the agent for communication via a voice call, chat session, or another communication channel.

After assigning the contact to an available agent, behavioral pairing method 200 may end. In some embodiments, multiple instances of behavioral pairing method 200 may be running simultaneously. For example, the contact center system may be assigning a first contact to an available agent while contemporaneously determining the preferred hold activity for several other contacts that have recently arrived at the contact center system.

Figure 3:
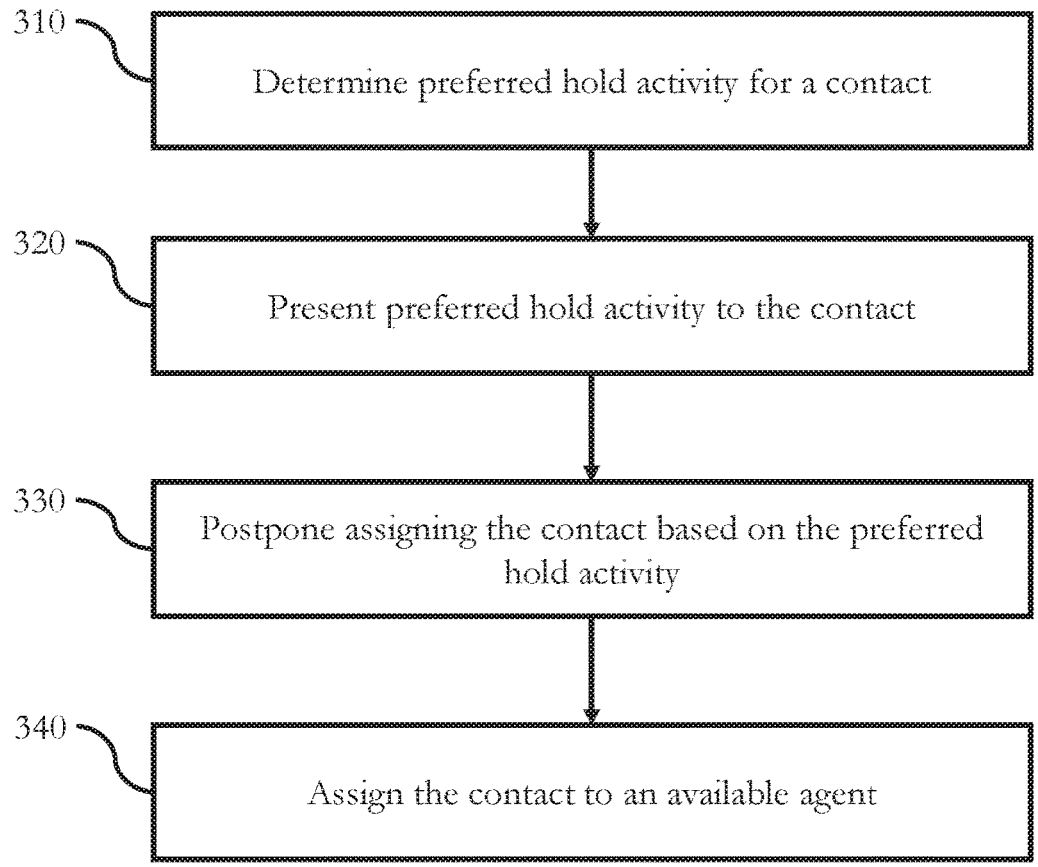
FIG. 3 shows a flow diagram of a behavioral pairing method according to embodiments of the present disclosure.

FIG. 3 shows a flow diagram of a behavioral pairing method 300 according to embodiments of the present disclosure behavioral pairing method 300 may begin at block 310.

At block 310, a preferred hold activity for a contact may be determined, as in block 210 of behavioral pairing method 200 (FIG. 2). Having determined the preferred hold activity for the contact, behavioral pairing method 300 may proceed to block 320.

At block 320, the preferred hold activity may be presented to the contact, as in block 220 of behavioral pairing method 200. During the presentation of the hold activity, behavioral pairing method 300 may proceed to block 330.

At block 330, assignment of the contact may be postponed based on the preferred hold activity. In some embodiments, a choice-based pairing strategy such as a BP strategy benefits from a delay or postponement as more contacts arrive or more agents become available for assignment. The increased amount of choice may improve the performance of the choice-based strategy. The effect of increasing choice on a BP strategy is described in detail in, for example, U.S. patent application Ser. No. 15/395,469, which is hereby incorporated by reference herein.

In some embodiments, behavioral pairing method 300 may postpone assignment based on the preferred hold activity by postponing until up to or after the conclusion of the hold activity. For example, if a caller is listening to a favorite song, the behavioral pairing method 300 may delay assigning the caller to an agent until the song is over. In other embodiments, the behavioral pairing method 300 may delay assigning the contact until the earlier of a preferred amount of choice becomes possible as more agents become available or when the preferred hold activity is over.

In some embodiments, the contact center system may have a service level agreement (SLA) in place that requires a contact to be assigned on a first-in, first-out (FIFO) basis if the contact has been waiting more than a predetermined amount of time (e.g., 30 seconds, 1 minute, 10% longer than the average wait time, etc.). In some of these embodiments, the SLA may be relaxed or extended to the duration of the hold activity. For example, an SLA may require contacts to be routed using a FIFO pairing strategy if they have been waiting longer than three minutes, but if a contact choose to listen to a song with a duration of 3 minutes and 47 seconds, the SLA for that contact may be extended for a period of time more than, equal to, or less than 47 seconds. In some scenarios, a contact may enjoy the entirety of the hold activity and still be assigned using a BP strategy because the contacts SLA will not be considered "blown" or otherwise exceeded.

Having postponed assignment of the contact based on the preferred hold activity, behavioral pairing method 300 may proceed to block 340.

At block 340, the contact may be assigned to an available agent. In some embodiments, the contact may be assigned to an available agent based on the preferred hold activity, as in block 230 of behavioral pairing method 200. In some situations, more agents may have become available during the delay, increasing the amount of choice available to the BP strategy and thereby improving the performance of the contact center system. In the embodiments in which SLAs have been extended, more contacts may be assigned using a BP strategy instead of FIFO (or another default routing strategy), thereby improving the performance of the contact center system.

After assigning the contact to an available agent, behavioral pairing method 300 may end. In some embodiments, multiple instances of behavioral pairing method 300 may be running simultaneously as with behavioral pairing method 200.

At this point it should be noted that behavioral pairing in a contact center system in accordance with the present disclosure as described above may involve the processing of input data and the generation of output data to some extent. This input data processing and output data generation may be implemented in hardware or software. For example, specific electronic components may be employed in a behavioral pairing module or similar or related circuitry for implementing the functions associated with behavioral pairing in a contact center system in accordance with the present disclosure as described above. Alternatively, one or more processors operating in accordance with instructions may implement the functions associated with behavioral pairing in a contact center system in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for behavioral pairing in a contact center system comprising:

determining, by at least one computer processor communicatively coupled to and configured to operate in the contact center system, a preferred hold activity for a contact;

presenting, by the at least one computer processor, the preferred hold activity to the contact;

analyzing, by the at least one computer processor, a behavioral pairing model with information about the preferred hold activity to pair the contact with an available agent to improve overall performance of the contact center system; and assigning, by the at least one computer processor, the contact to the available agent based at least in part upon the analysis.

2. The method of claim 1, wherein the preferred hold activity is playing music preferred by the contact.

3. The method of claim 1, wherein the preferred hold activity is delivering informational messages preferred by the contact.

4. The method of claim 1, wherein determining the preferred hold activity comprises receiving, by the at least one computer processor, input from the contact about the preferred hold activity.

5. The method of claim 1, wherein the behavioral pairing model includes information about the preferred hold activity to pair the contact with the available agent to produce an optimized outcome that results in improved overall performance for the contact center system compared to a behavioral pairing model that does not include information about the preferred hold activity.

6. A method for behavioral pairing in a contact center system comprising:

determining, by at least one computer processor communicatively coupled to and configured to operate in the contact center system, a preferred hold activity for a contact;

presenting, by the at least one computer processor, the preferred hold activity to the contact;

analyzing, by the at least one computer processor, a behavioral pairing model with information about the preferred hold activity to pair the contact with an available agent to improve overall performance of the contact center system;

postponing, by the at least one computer processor, assigning the contact based on the preferred hold activity; and after postponing, assigning, by the at least one computer processor, the contact to the available agent based at least in part upon the analysis.

7. The method of claim 6, wherein the behavioral pairing model includes information about the preferred hold activity to pair the contact with the available agent to produce an optimized outcome that results in improved overall performance for the contact center system compared to a behavioral pairing model that does not include information about the preferred hold activity.

8. The method of claim 6, further comprising extending, by the at least one computer processor, a default service level agreement for the contact based on information about the preferred hold activity.

9. The method of claim 6, wherein the preferred hold activity is listening to music preferred by the contact.

10. The method of claim 6, wherein the postponing is based on a duration of the preferred hold activity.

11. A system for behavioral pairing in a contact center system comprising:

at least one computer processor communicatively coupled to and configured to operate in the contact center system, wherein the at least one computer processor is further configured to:

determine a preferred hold activity for a contact;

present the preferred hold activity to the contact;

analyze a behavioral pairing model with information about the preferred hold activity to pair the contact with an available agent to improve overall performance of the contact center system; and assign the contact to the available agent based at least in part upon the analysis.

12. The system of claim 11, wherein the preferred hold activity is playing music preferred by the contact.

13. The system of claim 11, wherein the preferred hold activity is delivering informational messages preferred by the contact.

14. The system of claim 11, wherein determining the preferred hold activity comprises receiving input from the contact about the preferred hold activity.

15. The system of claim 11, wherein the behavioral pairing model includes information about the preferred hold activity to pair the contact with the available agent to produce an optimized outcome that results in improved overall performance for the contact center system compared to a behavioral pairing model that does not include information about the preferred hold activity.

16. A system for behavioral pairing in a contact center system comprising:

at least one computer processor communicatively coupled to and configured to operate in the contact center system, wherein the at least one computer processor is further configured to:

determine a preferred hold activity for a contact;

present the preferred hold activity to the contact;

analyze a behavioral pairing model with information about the preferred hold activity to pair the contact with an available agent to improve overall performance of the contact center system;

postpone assigning the contact based on the preferred hold activity; and after postponing, assign the contact to the available agent based at least in part upon the analysis.

17. The system of claim 16, wherein the behavioral pairing model includes information about the preferred hold activity to pair the contact with the available agent to produce an optimized outcome that results in improved overall performance for the contact center system compared to a behavioral pairing model that does not include information about the preferred hold activity.

18. The system of claim 16, wherein the at least one computer processor is further configured to:

extend a default service level agreement for the contact based on information about the preferred hold activity.

19. The system of claim 16, wherein the preferred hold activity is listening to music preferred by the contact.

20. The system of claim 16, wherein the postponing is based on a duration of the preferred hold activity.

21. An article of manufacture for behavioral pairing in a contact center system comprising:

a non-transitory processor readable medium; and instructions stored on the medium;

wherein the instructions are configured to be readable from the medium by at least one computer processor communicatively coupled to and configured to operate in the contact center system and thereby cause the at least one computer processor to operate so as to:

determine a preferred hold activity for a contact;

present the preferred hold activity to the contact;

analyze a behavioral pairing model with information about the preferred hold activity to pair the contact with an available agent to improve overall performance of the contact center system; and assign the contact to the available agent based at least in part upon the analysis.

22. The article of manufacture of claim 21, wherein the preferred hold activity is playing music preferred by the contact.

23. The article of manufacture of claim 21, wherein the preferred hold activity is delivering informational messages preferred by the contact.

24. The article of manufacture of claim 21, wherein determining the preferred hold activity comprises receiving input from the contact about the preferred hold activity.

25. The article of manufacture of claim 21, wherein the behavioral pairing model includes information about the preferred hold activity to pair the contact with the available agent to produce an optimized outcome that results in improved overall performance for the contact center system compared to a behavioral pairing model that does not include information about the preferred hold activity.

26. An article of manufacture for behavioral pairing in a contact center system comprising:

a non-transitory processor readable medium; and
instructions stored on the medium;
wherein the instructions are configured to be readable from the medium by at least one computer processor communicatively coupled to and configured to operate in the contact center system and thereby cause the at least one computer processor to operate so as to:

determine a preferred hold activity for a contact;
present the preferred hold activity to the contact;
analyze a behavioral pairing model with information about the preferred hold activity to pair the contact with an available agent to improve overall performance of the contact center system;
postpone assigning the contact based on the preferred hold activity; and
after postponing, assign the contact to the available agent based at least in part upon the analysis.

27. The article of manufacture of claim 26, wherein the behavioral pairing model includes information about the preferred hold activity to pair the contact with the available agent to produce an optimized outcome that results in improved overall performance for the contact center system compared to a behavioral pairing model that does not include information about the preferred hold activity.

28. The article of manufacture of claim 26, wherein the at least one computer processor is further caused to operate so as to:

extend a default service level agreement for the contact based on information about the preferred hold activity.

29. The article of manufacture of claim 26, wherein the preferred hold activity is listening to music preferred by the contact.

30. The article of manufacture of claim 26, wherein the postponing is based on a duration of the preferred hold activity.

* * * * *